UNITED STATES PATENT OFFICE.

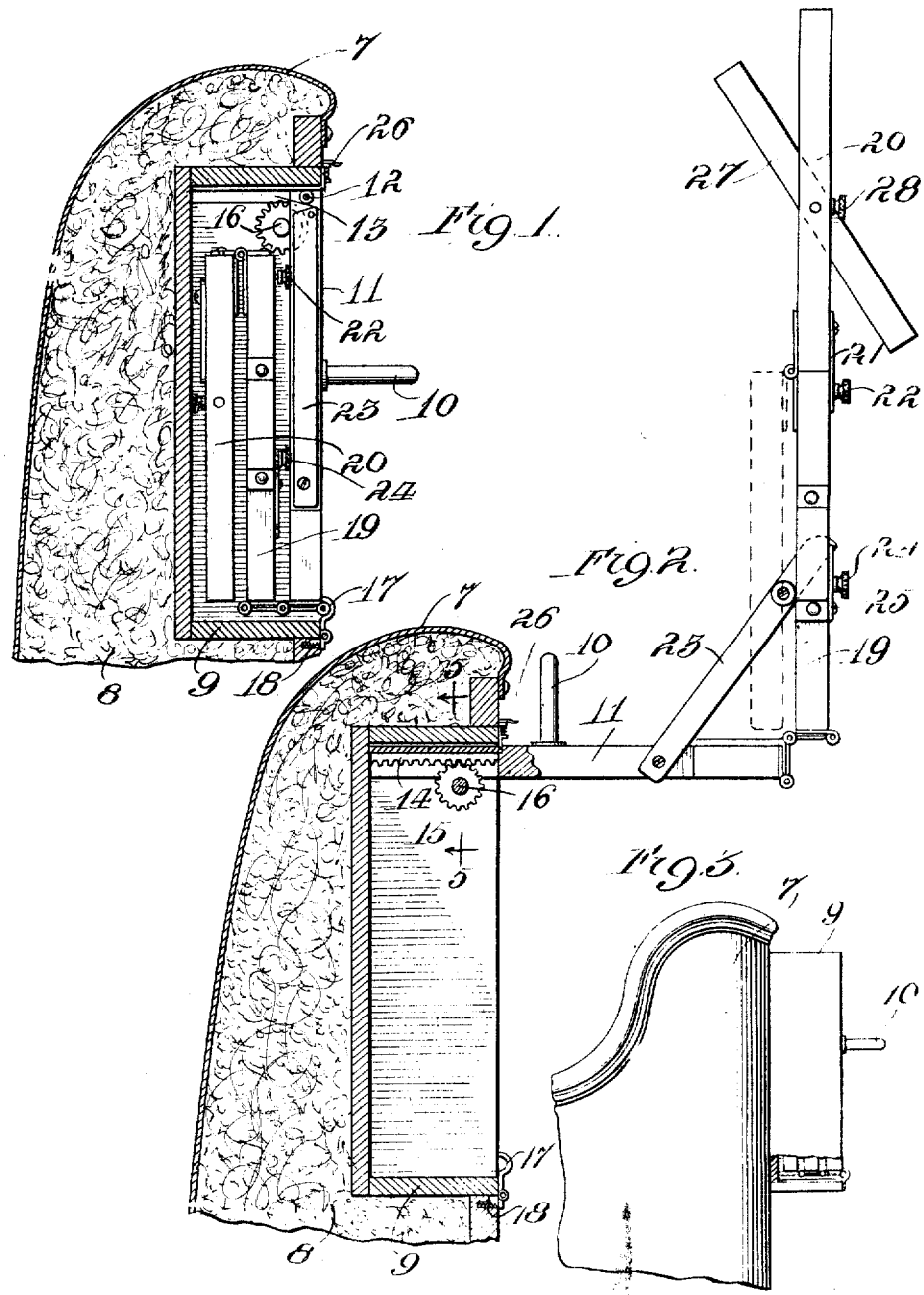

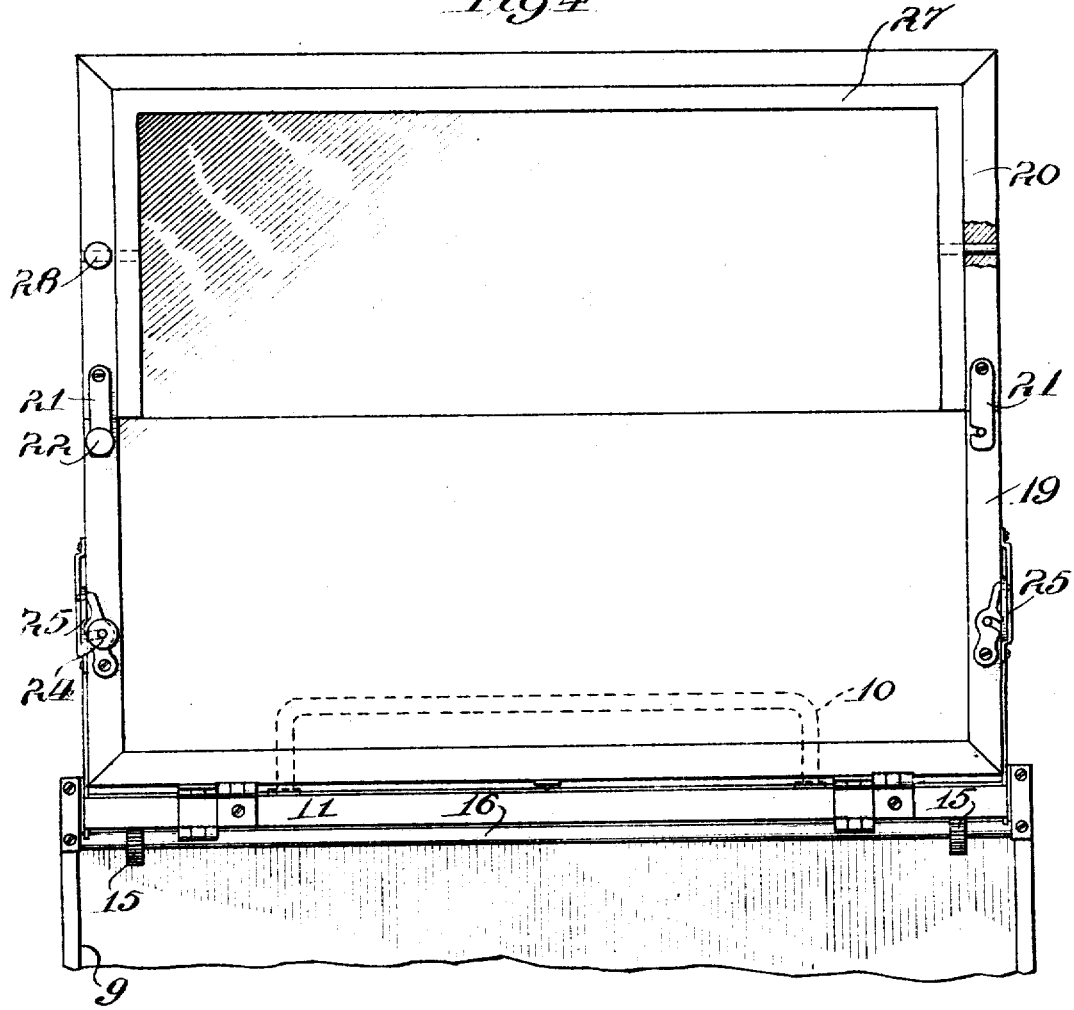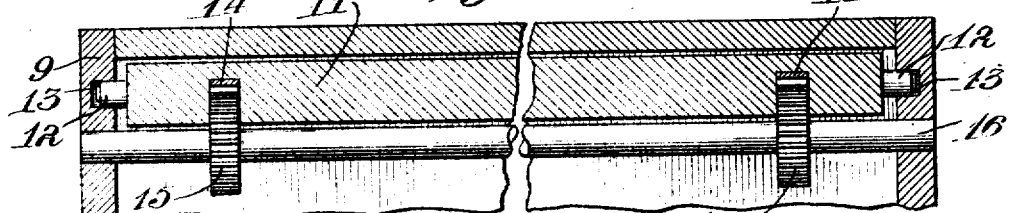

PETER J. BERNARD AND JOSEPH BOYLE, OF CHICAGO, ILLINOIS.

WIND-SHIELD.

1,075,754.  Specification of Letters Patent.  Patented Oct. 14, 1913.

Application filed December 2, 1912. Serial No. 734,528.

*To all whom it may concern:*

Be it known that we, PETER J. BERNARD and JOSEPH BOYLE, citizens of the United States, residing at Chicago, in the county of Cook and State of Illinois, have invented certain new and useful Improvements in Wind-Shields, of which the following is a specification.

This invention relates to wind shields adapted for use on moving vehicles, automobiles, boats, etc., and is particularly concerned with the arrangement of the parts thereof, whereby the shield may be folded up and be placed out of the way when not in use.

It is sought in our invention to provide an improved wind shield particularly designed to be located upon the rear side of the front or driver's seat of a vehicle to deflect rushing wind from passengers riding in the rear portion thereof; to arrange the wind shield so as to be foldable either within the rear portion of the front or driver's seat and be flush therewith when not in use, or to fold together into a separate compartment attached to the rear side of the driver's seat as now found in the ordinary type of vehicle body.

The invention further relates to the features of construction and combination of parts as hereinafter described and claimed.

In the drawings, Figure 1 is a section through the end of the front or driver's seat of a vehicle body showing the wind shield of our invention folded away within a suitable compartment provided therein; Fig. 2 is a similar view showing the wind shield unfolded and arranged to shield the passengers in the rear of the vehicle body; Fig. 3 is a view similar to Fig. 1 showing the wind shield as arranged within a portable casing which may be attached to the ordinary type of vehicle seat back; Fig. 4 is a rear elevation looking toward the front of the vehicle showing the shield extended in position for use; and Fig. 5 is a detail in cross-section taken on line 5—5 of Fig. 2.

Open vehicles and automobiles especially are frequently equipped with wind shields located in front of the driver, and usually over the dash board. While this affords considerable protection from the rushing air to those in the front seat, its protection does not extend to those occupying seats in the tonneau or rear portion of the vehicle. A wind shield arranged to protect occupants of the rear seat of an automobile should be collapsible in such a manner as not to interfere when folded away with the movement of passengers, and not to present an unsightly appearance when so collapsed. Such a type of wind shield is disclosed in the present invention.

There is shown in the drawings a portion of the back of a forward vehicle seat 7 arranged to provide a compartment 8 therein, within which the casing 9 of the folding wind shield may be seated. As shown in Fig. 3, this wind shield when acquired as a supplementary attachment may be secured upon the rear side of the seat back when no compartment is provided for its reception in the seat back furnished with the automobile body. The usual form of robe rail 10 may be provided upon which robes, blankets, etc., may be hung.

The wind shield comprises a solid section 11 adapted, when in folded position, to lie substantially flush with the rear of an automobile seat, as shown in Fig. 1, said section being supported as by a shaft 12 slidably mounted within suitable grooves 13 formed at either end of the casing. Adjacent each end of the section 11 is a rack 14 adapted to engage each with a pinion 15 suitably locked as to a shaft 16 extending longitudinally of the wind shield casing. The section 11 is at its lower edge retained in flush position with the seat back as by means of a longitudinally extending lip member 17 disposed normally to hold the shield in folded position as by means of the tension member 18. The section 11, when outwardly swung to a horizontal position, may be slid inwardly to some extent into the casing 9, the shaft 12 traveling within the grooves 13, and the racks 14 engaging with the pinions 15 secured to the common shaft 16 to prevent binding or uneven travel of the section 11 into the casing. In this position the pinions 15 serve also as a support for the section 11.

Secured to the lower end of the section 11 as by means of triple leaf hinges is a wind shield frame section 19 which in turn is hingedly secured to another wind shield frame section 20. As shown in Fig. 2, these frame sections 19 and 20 are adapted to be swung into alinement with one another being held in such alined position as by means of links 21 which may be locked by suitable thumb screws 22. The shield sections so alined may be maintained in vertical position and perpendicularly with respect to the section 11 as by means of brace arms 23 pivotally secured to the said section at the ends thereof and in locking engagement with the wind shield section 19 as by means of thumb nuts 24 and guide plates 25. To hold the section 11 securely in horizontal position within the casing a lock 26 is provided, thereby preventing displacement due to the pressure of air thereagainst.

As shown in Figs. 2 and 4 the shield, when extended, is designed to afford ample protection to the occupants seated therebehind from the rushing of the air. Should it be desired to arrange the shield to allow a limited passage of air thereover the upper section 20 may be folded down as indicated by the dotted lines in Fig. 2. The upper shield section is further shown as formed with a frame 27 tiltably secured therein, and arranged to be locked in any desired position as by means of a thumb nut 28. Without folding down the upper section, therefore, a nice adjustment thereof may be made by tilting the frame within this section to the desired angle. (See Fig. 2.)

The frame sections 19 and 20 are preferably equipped with glass or any other suitable transparent material, flexible or otherwise to protect against the wind and to admit of a clear view therethrough. The present invention contemplates a collapsible frame adapted, when folded, to be swung neatly away within the compartment provided for that purpose. Although certain means are illustrated for locking the parts in their extended positions, it is not our intention to be limited thereby, since obviously other well known means would answer. It is furthermore to be noted that by arranging the section 11 so that it may be inwardly slid when the wind shield is extended for use, it projects only a slight distance into the seating compartment of the vehicle, and therefore occupies but little space therein. The ledge formed by said section when upturned to a horizontal position may further be utilized as a space upon which blankets, robes or other like articles may be conveniently placed.

We claim:

1. In a device of the class described, a casing having one side thereof swingingly and inwardly slidably secured thereto, a foldable wind shield comprising a plurality of hinged sections pivotally secured to the swinging edge of said casing side and adapted when folded to lie entirely within said casing, and means for locking said wind shield in extended position when unfolded, substantially as described.

2. In a device of the class described, a casing having one side thereof swingingly and inwardly slidably secured thereto, a foldable wind shield pivotally secured to the swinging edge of said casing side and adapted when folded to lie entirely within said casing, and means for locking said wind shield in extended position when unfolded, substantially as described.

3. In a device of the class described, a casing having one side thereof swingingly and inwardly slidably secured thereto, means for sustaining said casing side horizontally of the casing, a foldable wind shield pivotally secured to the swinging edge of said casing side and adapted when folded to lie entirely within said casing, and means for locking said wind shield in extended position when unfolded, substantially as described.

4. In a device of the class described, a casing having one side thereof swingingly and inwardly slidably secured thereto, means for equalizing the inward sliding movement of the said casing side, a foldable wind shield pivotally secured to the swinging edge of said casing side and adapted when folded to lie entirely within said casing, and means for locking said wind shield in extended position when unfolded, substantially as described.

5. In a device of the class described, a casing having one side thereof swingingly and inwardly slidably secured thereto, means for equalizing the inward sliding movement of said casing side, means for sustaining said casing side horizontally of the casing, a foldable wind shield pivotally secured to the swinging edge of said casing side and adapted when folded to lie entirely within said casing, and means for locking said wind shield in extended position when unfolded, substantially as described.

6. In a device of the class described, a casing having one side thereof swingingly and inwardly slidably secured thereto, means for sustaining said casing side horizontally of the casing, said means serving also to equalize the inward sliding movement of said casing side, a foldable wind shield pivotally secured to the swinging edge of said casing side and adapted when folded to lie entirely within said casing, and means for locking said wind shield in extended position when unfolded, substantially as described.

7. In a device of the class described, a casing having one side thereof swingingly and inwardly slidably secured thereto, a foldable wind shield comprising a plurality of hinged sections pivotally secured to the swinging edge of said casing side and adapted when folded all to lie entirely within said casing, and means for locking all or part of said hinged shield sections in extended position, substantially as described.

8. In a device of the class described, a casing having one side thereof swingingly and inwardly slidably secured thereto, a foldable wind shield comprising a plurality of hinged sections pivotally secured to the swinging edge of said casing side, and adapted when folded to lie entirely within said casing, a tiltable frame secured within one of said sections, means for locking said frame in tilted position, and means for locking the wind shield in extended position when unfolded, substantially as described.

9. In a device of the class described, a casing having one side thereof swingingly and inwardly slidably secured thereto, a foldable and tiltable wind shield pivotally secured to the swinging edge of said casing side, and adapted when folded to lie entirely within said casing, and means for locking said wind shield in tilted and extended position when unfolded, substantially as described.

10. In a device of the class described, a casing having one side thereof swingingly and inwardly slidably secured thereto, a foldable wind shield comprising a plurality of hinged sections pivotally secured to the swinging edge of said casing side, and adapted when folded all to lie entirely within said casing, a tiltable frame secured within one of said sections, means for locking said frame in tilted position, and means for locking all or part of said hinged shield sections in extended position, substantially as described.

PETER J. BERNARD.
JOSEPH BOYLE.

Witnesses:
H. J. GRAFFY,
P. SUTTER.

Copies of this patent may be obtained for five cents each, by addressing the "Commissioner of Patents, Washington, D. C."